United States Patent Office 3,340,335
Patented Sept. 5, 1967

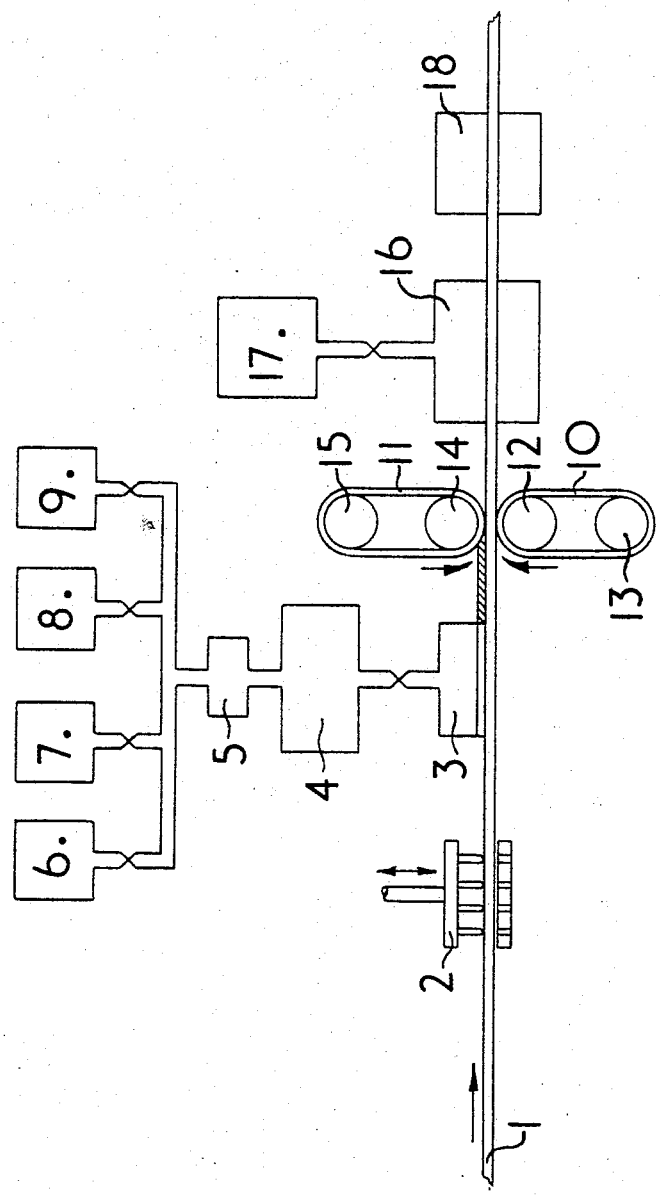

3,340,335
METHOD FOR MAKING COMPOSITE
FIBROUS MATERIALS
John Jeremy Winchcombe, Salisbury, England, assignor to Dunlop Rubber Company Limited, London, England, a British company
Filed Sept. 24, 1963, Ser. No. 311,246
Claims priority, application Great Britain, Oct. 17, 1962, 39,236/62
11 Claims. (Cl. 264—45)

This invention relates to a method for making composite materials comprising a fibrous constituent and a flexible or rigid polyurethane foam constituent.

According to the present invention, such a composite material is made by a method in which an assembly of fibres has introduced into it first a liquid composition representing one part of a polyurethane-foam-forming mixture and subsequently a vapour representing the complementary part of the polyurethane-foam-forming mixture, the vapour comprising at least one ingredient necessary for the polyurethane foam reaction, and the liquid composition and the vapour being allowed to react and form a polyurethane foam within the assembly of fibres.

By the technique of the present invention it is possible to introduce a flexible or rigid polyurethane foam into the interstices of a fibrous material without the considerable danger of collapse of the foam which is present in methods previously proposed for producing a composite material of the kind in question, in which the whole of a polyurethane-foam-forming mixture (unfoamed, partially foamed, or fully foamed) was to be introduced into an assembly of fibres. A wide variety of fibrous assemblies can be used in a method in accordance with the present invention, which may if desired be compressed or moulded during or just after foaming, and correspondingly a wide variety of products can be obtained. For instance, the assembly of fibres can be a mat of interpenetrated crimped continuous fibres as used in the technique of co-pending application of Goy et al. 176,051 filed Feb. 27, 1962, and assigned to the assignee of the present application and in this case a product in the nature of a leather-like sheet material can be obtained. When products in the nature of leather-like sheet materials are to be made, various measures may be adopted if desired to secure a differentiation in appearance between the two surfaces of the sheet material, more or less corresponding with the differentiation between the "grain" and "flesh" surface of natural leather; in this connection reference may be made to Examples V, VI and IX below. Thus the assembly of fibres may comprise two fibrous webs superimposed one upon the other, and the structure obtained when the polyurethane-foam-forming reaction has taken place may then be separated into two layers corresponding to the original two webs; the layers obtained may be treated again individually in accordance with the invention (see Example V). Again, the assembly of fibres may be moulded during foaming between an impervious surface and a porous surface (see Example VI). Variation of the type of product can also be effected by the step of passing the assembly of fibres beforehand through a needle-punching machine (or needle loom). It is also possible to produce by a method in accordance with the present invention material suitable for use in making thermally-insulating clothing. Again, products in the nature of fibre-reinforced insulating foams suitable for use in the walls of structures of various kinds may be obtained using a rigid-polyurethane-foam-forming mixture and arranging for maximum occupation by the foam of the interstices of the fibrous assembly. The degree to which the interstices of the fibrous assembly are filled up can be controlled by regulating the proportion of the polyurethane-foam-forming mixture, the degree of expansion of this mixture in foaming, and the degree to which the whole body of material is compressed (as by being confined in a mould) during the formation of the polyurethane foam or after formation of the foam but before completion of the curing reaction; if desired, the three variables just mentioned may be so adjusted that the foam emerges from the fibrous assembly on one or both (or all) surfaces.

The vapour which represents the complementary part of the polyurethane-foam-forming mixture which is introduced into the assembly of fibres after the liquid composition may generally comprise any one or more active ingredients of the polyurethane-foam-forming mixture which can conveniently be obtained in vapour form at the temperatures which can be made to prevail within the assembly of fibres. The vapour used may thus comprise steam, or an amine catalyst, e.g. triethylamine, which boils at 90° C., or N-methyl-morpholine, which boils at 116° C., for instance. Normally the introduction of the vapour is effected simply by suspending or supporting the assembly of fibres (carrying the liquid composition) in a vessel or chamber in which the vapour is present at the appropriate temperature and pressure, but it should be appreciated that if the assembly of fibres is to be compressed or moulded during the step of introducing the vapour, the plates, mould-parts or other members between which it is confined should generally be of a perforated construction or another construction permeable to the vapour, and/or be lined with gauze or the like; alternatively, however, the vapour may be formed in situ from the liquid phase of the substance in question, e.g. as in Example VI below. Since the ingredient(s) previously withheld from the polyurethane-foam-forming mixture will merely diffuse in vapour form into the liquid composition when the latter has already been introduced into the assembly of fibres, it will be appreciated that the possibility of foam collapse present in the previously-proposed methods referred to earlier is eliminated, the foam being formed wholly in situ and the shear forces acting on the nascent foam being thus reduced to very low values.

The liquid composition representing one part of the polyurethane-foam-forming mixture may comprise if desired a liquid reaction product of an organic polyiso-(thio)cyanate and an organic compound having two or more isocyanate-reactive groups, rather than these two principal ingredients in un-prereacted form, provided that the reaction product just referred to still has —NCO (or —NCS) groups available for reaction. Generally the formulation of the polyurethane-foam-forming mixture can correspond with the normal practive familiar to those skilled in the art, but the liquid composition may if desired take the form of a solution of the active ingredients in an inert solvent (e.g. methyl ethyl ketone); such a solution can be used as a bath into which the fibrous assembly is dipped as an alternative to having the liquid composition spread on to one surface of it with subsequent application of a doctor blade, for instance. Generally it is desirable to mangle the fibrous assembly after application of the liquid composition, with a view to securing sufficiently uniform distribution.

One embodiment of the method of the present invention is illustrated diagrammatically in the accompanying drawing which is by way of example only and not by limitation.

A fibrous assembly 1 is passed through a needle-punching machine 2 in order to effect consolidation of the assembly. The punched assembly is then impregnated with a liquid composition representing one part of the polyurethane-foam-forming mixture from a spreader 3. The liquid composition may be any one or a mixture of various ingredients for example, a liquid urethane rubber containing reactive isocyanate groups, 2:6 tolylene diisocyanate, 2:4 tolylene diisocyanate, trimethylolpropane, hexanetriol and triethylene-diamine solution, which are stored in separate containers 6, 7, 8, 9 and fed as required into a mixer 5 and thence to a cooler 4 from which the mixture is fed to the spreader 3.

The impregnated fibrous assembly is mangled between polyethylene foils 10, 11 which pass around rollers 12, 13 and 14, 15 and is then exposed in a chamber 16 to an atmosphere of a vapour representing the complementary part of the polyurethane-foam-forming mixture, for example steam, so that a polyurethane foam is formed within the impregnated web, the vapour being fed from a storage chamber 17.

Finally the fibrous assembly is heated and compressed in a mould or press 18 to complete the cure of the polyurethane foam and form a composite sheet material of the desired thickness.

The following examples illustrate the invention.

*Example I*

A fibrous web consisting of crimped 6-denier nylon 66 monofilaments laid under light tension in the form of parallel continuous yarns and subsequently relaxed, development of maximum crimp being aided by warming under infra-red lamps, was passed four times through a needle-punching machine (or needle loom), thereby yielding a ¼″-thick felt weighing 20 grams/sq. ft.

100 parts by weight of a liquid urethane rubber containing reactive NCO groups and sold under the name "Adiprene L–100" were mixed by means of a high-speed stirrer with 20 parts of a mixture of 80% of 2:4-tolylene diisocyanate and 20% of 2:6-tolylene diisocyanate, 6 parts of a 2:1 mixture of trimethylolpropane and hexanetriol, 1 part of a 10% solution of triethylene diamine in dry acetone, and 3 parts of water-soluble silicone sold under the name "Silicone L–520."

This mixture reached about 80° C. on account of the heat of stirring and the chemical exothermic heat. It was allowed to cool to room temperature in a closed vessel.

After cooling, the viscous liquid mixture was uniformly spread by means of a doctor blade on to one surface of the nylon web in the proportion of 3 parts by weight of mixture to 1 part by weight of nylon. The coated web was sandwiched between two polyethylene foils, and passed through the nip between a pair of rubber-coated rollers. This distributed the liquid uniformly throughout the web.

The polyethylene foils were peeled off and the web was suspended in an atmosphere of steam at atmospheric pressure for 10 minutes.

Contact with the steam caused the liquid polyurethane to foam and then gel in situ within the web, and at the end of the 10 minutes the product was placed in a hot-air oven at 80° C. for 20 minutes to dry and to assist the urethane polymer to develop its full strength.

The product consisting of a ¼″-thick, flexible bonded felt in which the polyurethane foam was substantially uniformly distributed in the fibre interstices. The average pore-diameter of the foam was finer than the average distance between adjacent fibres. The tear strength of the felt-like structure so produced was high even when the direction of tear was parallel to the direction in which the tensioned nylon yarns were originally laid.

*Example II*

The procedure followed was similar to that of Example I, except that during the exposure to steam the impregnated web was held under compression at ⅛″ thickness between sheets of fine polyethylene gauze backed by ¼″ plates of perforated aluminum.

The product was a felt of approximately ⅛″ thickness, in which the pore-size of the foam was approximately commensurate with the inter-fibre distances. It was denser and stronger than that of Example I.

*Example III*

The procedure was similar to that of Example II, except that the exposure to steam was carried out for a period of 7 minutes in an autoclave at 15 lb./sq. in. gauge pressure. The product was similar to that of Example II.

*Example IV*

The procedure was similar to that of Example I, except that the impregnating liquid was prepared as follows:

The mixture, from which the triethylene diamine and the silicone had been omitted, was heated with stirring for 2 hours at 90° C. in a closed vessel and then cooled to room temperature. 0.6 part of water and 3 parts of L–520 Silicone were then stirred in. After impregnating the fibre mat with this composition, it was exposed to the vapour of boiling triethylamine instead of steam. The product was similar to that of Example I.

*Example V*

Two needled webs each made as in Example I were superimposed with their initial stretched-yarn directions parallel, and the assembly passed through a dipping bath of the following composition and then tightly mangled between polypropylene foils.

| Dipping bath: | Parts by weight |
|---|---|
| Liquid urethanerubber (Adiprene L–100) | 100 |
| Dried redistilled methyl ethyl ketone | 400 |
| Trimethylolpropane (predissolved in the methyl ethyl ketone) | 4 |
| Stannous octoate | 1 |

The wet, mangled web, still sandwiched between the polypropylene foils, was immediately transferred to a mould having a ⅛″-deep flat cavity and pressed at 130° C. for 10 minutes. After cooling to room temperature the assembly was removed, the polypropylene foils peeling off easily. It was then separated into two layers, corresponding to the original two webs, by gently splitting. Each of these layers had one lightly bonded surface (provided by the splitting) and one heavily bonded surface (which had been in contact with the mould during the pressing). These heavily bonded surfaces were not completely closed.

Each layer at this stage weighed about 30 grams/sq. ft. and measured about ¹⁄₁₆″ in thickness.

Each layer was now treated by the process described for the plain impregnated web in Example II with the variations that 2 parts by weight of liquid polyurethane mixture were used to 1 part by weight of the original weight of nylon, and that the mixture was applied by means of a doctor blade on to the lightly bonded surface.

The product was a ¹⁄₁₆″ thick leather-like sheet having foam impregnated into all its interstices. The general appearance and feel strongly resembled that of tanned natural leather having a close "grain" surface on one side and a looser "flesh" surface on the other side.

*Example VI*

A nylon web impregnated with liquid polyurethane was prepared as in Example I, and after the mangling step the polyethylene foils were peeled off and the web laid on a foil of polypropylene. Then a sheet of thick unsized paper, well wetted with water, was laid on the back of the web and the assembly pressed for 7 minutes at 110° C. in a mould provided with ³⁄₁₆″ spacers and then cooled to room temperature in the press.

On opening the press the polypropylene foil easily peeled off the assembly and the paper was removed by means of a fine wire brush.

The product was a ⁵⁄₃₂″-thick sheet of leathery material impregnated throughout with fine-pored foam. The surface which had been pressed in contact with the polypropylene was smooth and glossy and the other surface (when freed from paper) was matt and some of its fibres had been raised by the brushing. The two surfaces were not unlike the "grain" and "flesh" sides of leather respectively.

*Example VII*

A length of bulked nylon 66 yarn was knitted into a lightweight stretch fabric and treated by the process of Example II with three times its weight of the liquid polyurethane mixture, but compressed to 1/16" thickness during the exposure to steam. The product was a supple, 1/16" thick sheet having fine-pored foam in nearly all its yarn interstices.

*Example VIII*

A square of woolen blanket material 1/8" thick was treated with twice its weight of the liquid polyurethane mixture by the process of Example II but pressing to 1/16".

The product consisted of a supple permeable material whose yarn interstices were partly filled with fine-pored foam.

*Example IX*

0.1 part of triethylene diamine was dissolved in 100 parts of a 2000 molecular weight polypropylene glycol diol. This solution was then mixed by means of a high-speed stirrer and under dry conditions with 34.8 parts of a mixture of 80% 2:4-tolylene diisocyanate and 20 of 2:6-tolylene diisocyanate.

This mixture reached about 70° C. on account of the heat of stirring and the chemical exothermic heat. It was allowed to cool to room temperature in a closed vessel.

7.5 parts of a mixture of 2 parts of trimethylolpropane and 1 part of hexanetriol were now stirred in under dry conditions. After further evolution of heat, the mixture was allowed to cool to room temperature again and then 3 parts of water-soluble silicone sold under the name "Silicone L–520" were stirred in. The resulting highly viscous liquid polyurethane was then used by the method of Example II to impregnate a surface-bonded needled nylon 66 web similar to that of Example V. The product was similar in appearance and feel to that of Example V.

Having now described my invention what I claim is:

1. A method of making a composite material comprising a fibrous constituent and a polyurethane foam constituent, comprising two stages, in the first of which a liquid composition representing one part of a polyurethane foam-forming mixture is introduced into an assembly of fibres, and subsequently in the second stage a vapour, which represents the complementary part of the polyurethane foam-forming mixture and which comprises at least one ingredient necessary for reaction with said liquid composition to form a foam and a solid foamed polymer, is introduced into the assembly of fibres and allowed to react with the liquid composition to form a polyurethane foam within the assembly of fibres.

2. A method according to claim 1, in which the assembly of fibres is molded before completion of the curing reaction.

3. A method according to claim 1, in which the assembly of fibres is a mat of interpenetrated crimped continuous fibres.

4. A method according to claim 1, in which the assembly of fibres used is one which has been passed beforehand through a needle-punching machine.

5. A method according to claim 1, in which the vapour specified is steam.

6. A method according to claim 1, in which the vapour specified is an amine catalyst selected from the group consisting of triethylamine and N-methyl-morpholine.

7. A method according to claim 1, in which the liquid composition specified comprises a liquid reaction product of an organic polyiso(thio)cyanate and an organic compound having at least two isocyanate-reactive groups, this reaction product still having groups selected from the class consisting of —NCO and —NCS available for reaction.

8. A method according to claim 1, in which the liquid composition specified has the form of a solution of active ingredients of the polyurethane-foam-forming mixture in methyl ethyl ketone or another inert solvent, and the assembly of fibres is dipped into this solution.

9. A method according to claim 1, in which the assembly of fibres comprises two fibrous webs superimposed one upon the other, and the structure obtained when the polyurethane-foam-forming reaction has taken place is separated into two layers corresponding to the original two webs.

10. A method according to claim 9, in which the layers obtained are treated again individually by a method comprising two stages in the first of which a liquid composition representing one part of a polyurethane foam-forming mixture is introduced into the layers, and subsequently in the second stage a vapour which represents the complementary part of the polyurethane foam-forming mixture and which comprises at least one ingredient necessary for the polyurethane foam reaction is introduced into the layers and allowed to react with the liquid composition to form a further quantity of polyurethane foam within the layers.

11. A method according to claim 1, in which the assembly of fibres is moulded during foaming between an impervious surface and a porous surface to simulate the appearance of natural leather.

References Cited

UNITED STATES PATENTS

| | | |
|---|---|---|
| 2,850,467 | 9/1958 | Livingood. |
| 2,972,554 | 2/1961 | Muskat et al. ____ 264—47 XR |
| 3,025,202 | 3/1962 | Morgan et al. ____ 264—115 XR |
| 3,050,427 | 8/1962 | Slayter et al. _____ 264—47 XR |
| 3,055,871 | 9/1962 | Heffler et al. |
| 3,062,682 | 11/1962 | Morgan et al. ____ 260—2.5 XR |

ALEXANDER H. BRODMERKEL, *Primary Examiner.*

P. E. ANDERSON, *Assistant Examiner.*